Aug. 12, 1941.   F. H. MEYER   2,252,193
APPARATUS FOR MAKING FLOWER HOLDERS
Filed Nov. 19, 1940    2 Sheets-Sheet 1
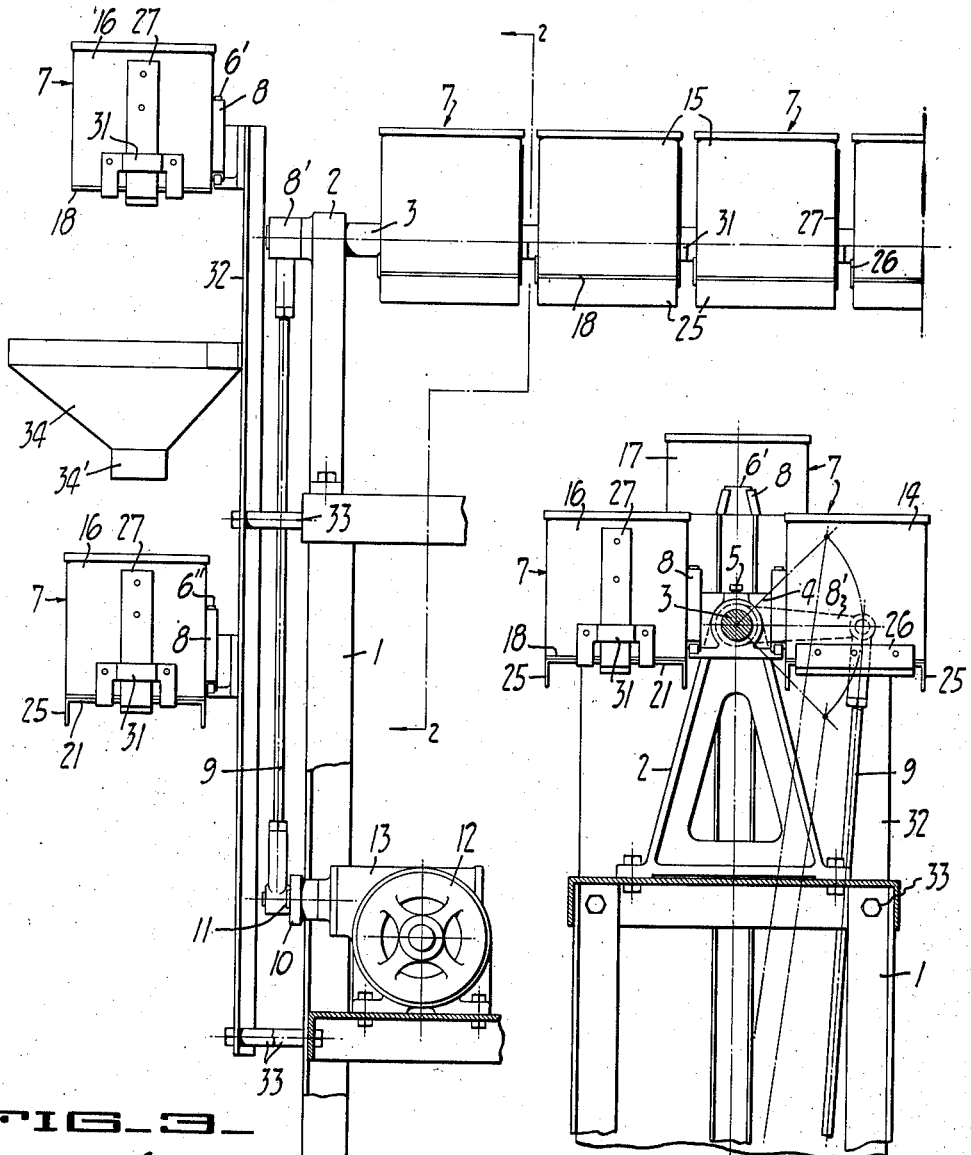
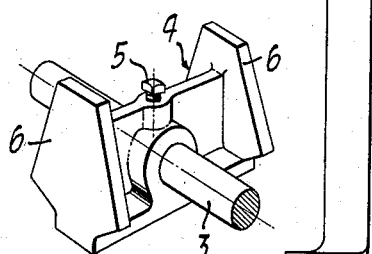
INVENTOR.
Ferd H. Meyer
BY
ATTORNEYS.

Aug. 12, 1941.　　　　F. H. MEYER　　　　2,252,193
APPARATUS FOR MAKING FLOWER HOLDERS
Filed Nov. 19, 1940　　　2 Sheets-Sheet 2
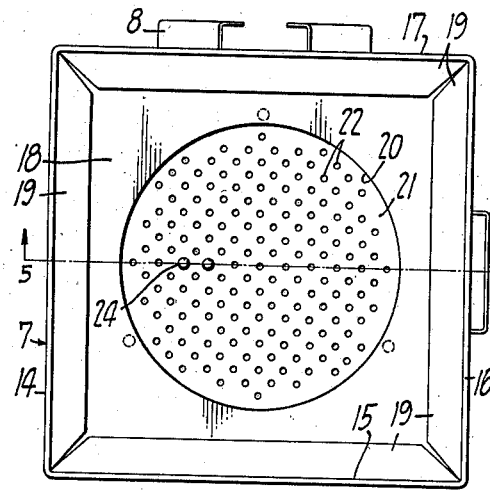
FIG_4_
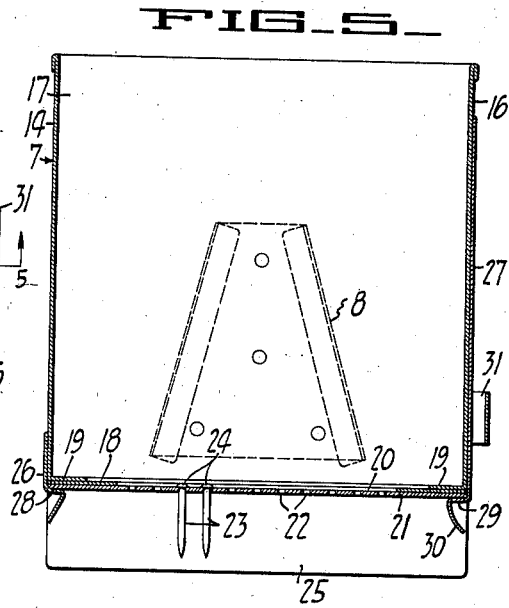
FIG_5_
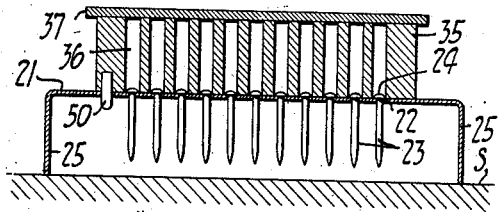
FIG_6_
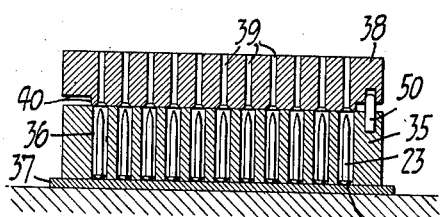
FIG_7_
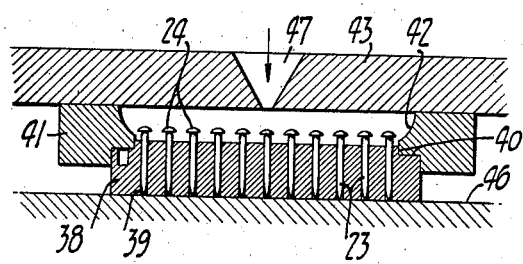
FIG_8_
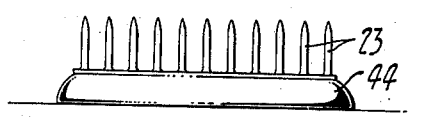
FIG_9_
INVENTOR.
Ferd H. Meyer
BY
ATTORNEYS.

Patented Aug. 12, 1941

2,252,193

UNITED STATES PATENT OFFICE 2,252,193

APPARATUS FOR MAKING FLOWER HOLDERS

Ferd H. Meyer, Oakland, Calif., assignor to Golden Gate Mfg. Co., Oakland, Calif.

Application November 19, 1940, Serial No. 366,280

5 Claims. (Cl. 22—58)

This invention relates to flower holders of the pin type, and has for its objects the provision of an improved apparatus for making the flower holders, which apparatus is simple, highly efficient and enables rapid and economical production of flower holders having the pins rigidly supported in a perfect predetermined arrangement and spacing for accomplishing the desired results. Other objects and advantages will appear in the following description and in the drawings annexed hereto.

In the drawings, Fig. 1 is an elevational view of one end of one form of the apparatus of the invention.

Fig. 2 is a sectional view taken along the line 2—2 of Fig. 1.

Fig. 3 is a perspective view of one of the pin receptacle supporting brackets.

Fig. 4 is an enlarged plan view of one of the pin receptacles.

Fig. 5 is a sectional view of the receptacle of Fig. 4 taken along line 5—5 of Fig. 4.

Fig. 6 is a sectional view of the bottom of the receptacle of Fig. 5 removed from the receptacle and positioned relative to a special transfer block transferring the pins from the bottom to the block.

Fig. 7 is a sectional view of the transfer block in position relative to a second transfer device that forms part of the ultimate mold.

Fig. 8 is a sectional view of the second transfer device of Fig. 7 positioned in a mold with a mold ring on the device.

Fig. 9 is an elevational view of the finished flower holder.

The subject matter herein disclosed is the same as that shown in my abandoned application, Ser. No. 205,586, filed May 2, 1938.

Briefly described, the flower holder produced by the apparatus hereinafter described, comprises a relatively heavy, disk-like base of lead or heavy metal, having one end of spaced pins secured therein and with the opposite pointed ends of the pins, including the major lengths of the pins, projecting from a side of the disk. With the flat side of the disk supported on a surface, such as the bottom of a bowl or receptacle, the upwardly directed pins provide means for impaling the stalks of flowers lengthwise thereof for supporting the flowers upright, or the stalks or stems may be held between the adjacent pins, according to the number of flowers and character of the stalks. No claim is made to the flower holder itself, since this is old in the art, but the apparatus and method for economically producing holders of this type has heretofore been difficult of accomplishment and it is the economical production of such holders generally with which this invention is concerned.

In detail, the apparatus shown in the drawings comprises a supporting frame 1 carrying a pair of spaced, opposed, horizontally aligned bearings 2 thereon (one only of the bearings being shown in Fig. 1). A horizontal shaft 3 is rotatably mounted at its ends in said bearings and secured to the shaft at spaced points therealong, are double ended brackets 4 (Fig. 3), said brackets each being formed with a central opening for the shaft 3 and a set screw 5 for securing the bracket to the shaft.

Each of the brackets projects laterally to opposite sides of the shaft and the opposite lateral ends thereof are provided with generally wedge shaped plate-like members 6 with their slanted edges divergently extending downwardly, said members being substantially parallel in the dimension of their planes.

Each of the members 6 functions to removably support a receptacle for pins thereon. Said receptacles are respectively designated by the numeral 7, and each receptacle carries on one of its sides a generally wedge-shaped socket 8 adapted to receive therein a wedge member 6 upon downward movement of the receptacle and socket, the diverging walls of the socket frictionally engaging the diverging edges of the members 6. The receptacle is quickly removed from each member 6 upon forceable upward movement thereof, but is tightly held on the member against downward movement and against any accidental movement relative to the member by reason of the close frictional engagement between the wedge surfaces of the member and socket.

The normal neutral position of the brackets 4 is horizontal, and any desired number of brackets may be secured on the shaft 3, according to the length of the shaft. Assuming that six brackets are on said shaft, it will be seen that provision is made for supporting twelve receptacles in parallel rows of six receptacles along opposite sides of the shaft 3.

One end of shaft 3 projects outwardly of one of the bearings 2 to which end is secured one end of a crank 8', the opposite end of said crank being pivotally connected to the end of a rod 9. The opposite end of rod 9 is pivotally connected to an end of a crank 10, said crank 10 being secured to shaft 11 which shaft is driven by a motor 12 through gears in a gear reduction box 13.

The crank 8' extends horizontally when the brackets 4 are horizontal, or in what has heretofore been termed "neutral" position, and crank 8' is appreciably longer than crank 10 and is positioned relative to crank 10 so that upon revolution of the latter crank, the crank 8' will oscillate through an arc of 90 degrees, or 45 degrees to either side of horizontal and at the same time, of course, the brackets 4 and the receptacles carried thereon will be similarly oscillated.

Referring to Figs. 4, 5, which show the receptacles 7 in detail, each receptacle is square with four sides 14 to 17 inclusive, and a bottom 18, the sides being bent inwardly over the margins of bottom 18 to form flanges 19 to which the bottom is secured as by welding or any other suitable means. The side 17 of each receptacle carries the socket member 8 hereinbefore described.

The bottom 18 is formed to provide a central circular opening 20 therein or an opening or several openings of the desired shape or shapes, and below bottom 18 and extending across said opening is a relatively thin plate 21 which plate is formed with a plurality of small openings 22 of a size adapted to permit passage of headed pins 23 (Fig. 5) from their pointed ends, but which openings are not sufficiently large to pass the heads 24 of the pins.

The plate 21 is formed with downwardly turned flanges 25 along two opposite edges only for receiving therebetween a shouldered clip 26 (Fig. 5) and a generally similar shouldered spring clip 27 for removably securing the plate 21 in place against the bottom 18 in a position with the openings 22 in the area defined by opening 20 in said bottom. The clip 26 is secured to side 14 with the shoulder 28 thereof extending across the lower edge of side 14 from end to end of said edge whereby one edge of plate 21, between said flanges, may be slipped between the shoulder and bottom 18, said clip also being of resilient material so as to yieldably hold the margin of said plate 21 tightly against the bottom. The flanges 25 will, of course, prevent any shifting of the plate in direction longitudinally of said edge. The spring clip 27 is shown in elevation in Fig. 2 on the left hand receptacle, and comprises a vertically elongated strip of spring metal extending vertically against the outer surface of side 16, to which side the strip is secured at its upper end leaving the lower end with shoulder 29 (Fig. 5) free to be forceably sprung away from said side 16, a slanted lip extension 30 projecting downwardly from the inner edge of shoulder 29 to facilitate such movement by the finger of an operator engaging said lip and which lip also formed for engaging the edge of plate 21 to force the shoulder outwardly upon drawing said plate upwardly to position the same in locked position against bottom 18. The shoulder 29 engages under the adjacent edge of plate 21 when the latter is positioned against said bottom. A metal strap 31 may be secured to side 16 of the receptacle in position extending transversely across the lower end of the strip of clip 27 as indicated in Figs. 2, 4 and 5, said strap being spaced from strip 27 where it extends thereacross with the ends thereof being turned inwardly toward side 16 to which the ends are secured.

It will be noted (Fig. 5) that the flanges 25 are of a width greater than the downwardly projecting lengths of pins 23, and thus will provide means for supporting the plate 21 on a surface without disturbing the pins 23.

Outwardly of the end of supporting frame 1 adjacent the cranks and rod 9 is a vertically extending supporting member 32, which member is secured to the frame by brackets 33. The upper end of said member carries a wedge-shaped bracket element 6', similar to the wedge-shaped member 6 of brackets 4, and which element is adapted to removably support any one of the receptacles 7 thereon. Below element 6' is a funnel 34 of a size to extend at its large upper open end across the downwardly projected area of a receptacle 7 supported on element 6'. Below funnel 34 is a second wedge-shaped element 6'', similar to element 6', that is likewise secured to member 32, and second element 6'' being adapted to removably support a receptacle 7 in position with its upper open end directly below the downwardly projected area of the smaller lower open end 34' of the funnel.

The manner of operation of the apparatus as described up to this point is as follows:

Each of the receptacles supported on brackets 4 are provided with a quantity of the headed pins 23, which quantity is proportional to the size of the receptacle and in the drawings, the quantity would be approximately to a depth substantially that of the length of the pins. The motor 12 is then started and the rows of receptacles on opposite sides of shaft 3 will be oscillated about the axis of the shaft through an arc of about 45 degrees above and 45 degrees below a horizontal plane. This causes the pins to slide backward and forward over perforated plate 21 and as the pins in the sliding mass are tumbled to positions with their pointed ends over the openings 22 and in substantial axial alignment with said holes, said pins will pass through the holes until stopped by their heads, and once in the holes they will not be thrown out or dislodged, since the rate of oscillation is kept below a speed that would tend to cause such dislodgement. At the end of each oscillatory movement of the receptacles, the remaining pins will be tumbled against side 15 or 17 to rearrange the pins to facilitate the passage of the pins into the openings 22 upon the return stroke.

In actual operation, the operator may readily observe when all of the openings 22 in any one of the receptacles are filled with pins, since the mass of pins in the receptacles at opposite ends of each oscillation substantially clears the pin heads and unfilled openings are plainly visible.

As soon as all of the openings 22 in any of the receptacles are filled, the operator slips the receptacle from the supporting bracket, and replaces it with another that contains a quantity of pins. The container thus removed is placed on bracket 6' and the plate 21 with the pins suspended therefrom is removed whereupon the surplus pins in the container will fall into the funnel 34 and through the lower end 34' thereof into a receptacle supported on bracket 6''. The receptacle on bracket 6'' after receiving the surplus pins, is ordinarily the receptacle that replaces the one that was removed from one of the brackets 4, since a sufficient number of pins is normally carried in each receptacle to fill the holes in plates 21 several times before the supply in the receptacles need be replenished. However, in this respect, it should be noted that the supply of pins in each receptacle should not exceed the amount that can readily be caused to slide from side to side of the receptacles, and neither should the supply be so scanty as to reduce the body of the mass below a sufficient amount to support a substantial number of the pins in inclined relation to the plate 21. The correct amount can readily be determined and is a layer of approximately the length of a pin in thickness in receptacles having sides say from three to five inches in width.

After the plate 21 with the pins suspended therein has been removed from the receptacle, said plate is supported on a flat surface S (Fig. 6) by flanges 25, and a block 35 of a thickness at least equal to the over-all length of the pins is placed on plate 21. Block 35 is formed with openings 36 therethrough arranged similar to openings 22 in plate 25. Openings 36 are of a diameter to receive therein heads 24 of the pins as well as the shafts thereof. A plate 37, secured to block 35 by any suitable means, covers the upper ends of openings 36 as illustrated in Fig. 6, and then the block and plate 21 are inverted, whereupon the pins fall into openings 36 with their heads resting on plate 37. A second block 38 (Fig. 7) is then placed over the transfer block 35, which second block carries openings 39 arranged similar to openings 36, but of a diameter just sufficient to allow the pin shafts to be received therein. The thickness of said block 38 is less than the overall lengths of the pins.

Upon inverting blocks 35, 38 together, the pins will fall point foremost into openings 39 in block 38 until stopped by the heads of the pins, and the point ends of the pins then project below the underside of block 38.

Blocks 35, 38 are preferably circular, and a rabbet 40 formed around the peripheral edge of block 38 coacts with a generally similar rabbet formed on ring 41 (Fig. 8) to form a rabbet joint when ring 41 is positioned on block 38 (Fig. 8).

The inner sides of ring 41, and the side of block 38 adjacent the heads of pins 23 together with the side of gate 43 over the ring 41 and in opposed relation to the said side of block 38, defines the contour of the ultimate supporting base 44 (Fig. 9) of the pin holder.

When the ring 46 and block 38 are positioned in the mold with the pointed ends of the pins supported on the base 46 of said mold, the heads of the pins will project above block 38, and molten metal poured through opening 47 in gate 43 will then surround the upwardly projecting heads. When the metal is cooled and the gate is removed, the base 44 of cooled metal, with the pins secured therein, is readily lifted free of block 38 by means of ring 41, and then by inverting the ring, the base will drop therefrom.

One or more positioning pins 50 projecting from block 35 may removably fit in registering openings in plate 21 (Figs. 6, 7) and block 38 has similar openings to receive pins 50, while somewhat similar positioning pins may be carried by ring 50 to fit in the said openings in block 38 for positioning the ring on said block.

It is obvious that the pattern of the holes in plate 21 may be varied, as desired, with corresponding variations in the pattern of the holes in blocks 35, 36. Also, the axis of oscillation of the receptacles may be varied, and may extend through the receptacles, or above or below them, but the preferred arrangement is shown in the drawings. It is, however, highly important that plate 21 be relatively thin, at least where the plate is perforated, for otherwise pins partially entering the holes 22 tend to be dragged out of the openings by the mass of pins sliding over the plate.

Having described my invention, I claim:

1. In apparatus of the character described, a container having a bottom plate adapted to support a plurality of headed nails thereon and within the container, said bottom plate being formed with a plurality of openings therein each of a size adapted to pass a single one of said nails only therethrough, exclusive of its head for suspending such nail in each opening from its head, means removably securing said bottom plate in position over the lower end of said container whereby nails suspended in said opening may be removed from the container separate from the nails supported on said plate, said plate being provided with projections rigid therewith and extending downwardly therefrom in direction away from the walls of said container a distance greater than the lengths of the nails adapted to be suspended from said plate whereby the said plate may be supported by said projections on a surface without disturbing said nails.

2. In apparatus of the character described, a container having a bottom plate adapted to support a plurality of headed nails thereon and within the container, said bottom plate being formed with a plurality of openings therein each of a size adapted to pass a single one of said nails only therethrough, exclusive of its head for suspending such nail in each opening from its head, means removably securing said bottom plate in position over the lower end of said container whereby nails suspended in said opening may be removed from the container separate from the nails supported on said plate, an imperforate flange carried by the walls of said container extending over the margin of said bottom on the side thereof facing into said container against which said bottom is supported, the outline of said flange at its free edge forming a shape defining the outline of the pattern of the openings in said bottom.

3. In apparatus of the character described, a horizontal shaft, a row of spaced brackets secured on said shaft at one side thereof, a container on each bracket and means removably securing each container to each bracket in a position with the bottom of the container lowermost, the bottom of each container being adapted to support a mass of headed nails thereon and said bottom being formed with a plurality of openings, each opening being of a size adapted to pass a single nail therethrough point foremost, except for the head of the nail whereby such nails as pass into each opening will be suspended by their heads from the edges of such opening, means for rotating said shaft in an oscillatory manner whereby said containers will be oscillated to cause agitation and sliding of the mass of nails adapted to be supported thereon to cause the nails to pass into said openings.

4. In a construction as defined in claim 3, a second row of brackets along the opposite side of said shaft and a container for headed nails secured to each bracket in said second row, each container having a bottom on which such nails are adapted to be supported, said bottom being formed with openings each of which is adapted to pass one only of such nails therethrough exclusive of the head thereof for suspending such nail by its head in each opening.

5. In a construction as defined in claim 3, the bottom in each container being separate from the side walls of the container, and means removably securing each of the said bottoms in position across the lower end of each container and to said walls for movement with the container.

FERD H. MEYER.